(12) United States Patent
Yamakawa

(10) Patent No.: US 10,824,117 B2
(45) Date of Patent: Nov. 3, 2020

(54) ELECTRONIC DEVICE, ELECTRONIC TIMEPIECE, DISPLAY CONTROL METHOD, AND STORAGE MEDIUM

(71) Applicant: CASIO COMPUTER CO., LTD., Tokyo (JP)

(72) Inventor: Eiji Yamakawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/180,348

(22) Filed: Nov. 5, 2018

(65) Prior Publication Data

US 2019/0137944 A1  May 9, 2019

(30) Foreign Application Priority Data

Nov. 6, 2017 (JP) ................................ 2017-213585

(51) Int. Cl.
```
G04G 9/00      (2006.01)
G02F 1/13357   (2006.01)
G09G 3/36      (2006.01)
G04G 9/12      (2006.01)
G04G 21/02     (2010.01)
```
(52) U.S. Cl.
CPC ..... *G04G 9/0047* (2013.01); *G02F 1/133611* (2013.01); *G04G 9/124* (2013.01); *G04G 21/02* (2013.01); *G09G 3/3648* (2013.01); *G02F 2001/133612* (2013.01); *G09G 2310/0237* (2013.01)

(58) Field of Classification Search
None
See application file for complete search history.

(56) References Cited

U.S. PATENT DOCUMENTS

| | | | | |
|---|---|---|---|---|
| 6,680,580 | B1* | 1/2004 | Sung | G09G 3/3233 |
| | | | | 315/169.3 |
| 2010/0182292 | A1* | 7/2010 | Kouno | G09G 3/3655 |
| | | | | 345/205 |
| 2015/0317938 | A1* | 11/2015 | Fujioka | G09G 3/3648 |
| | | | | 345/212 |
| 2019/0094590 | A1* | 3/2019 | Aoki | G06F 3/04166 |

FOREIGN PATENT DOCUMENTS

| | | | |
|---|---|---|---|
| JP | 2003-280601 A | 10/2003 | |
| JP | 2011-123100 A | 6/2011 | |
| JP | 2013-205688 A | 10/2013 | |
| JP | 2014-48240 A | 3/2014 | |
| JP | WO2017154657 | * 9/2017 | .............. G09G 3/36 |

OTHER PUBLICATIONS

Japanese Office Action dated Aug. 4, 2020, in a counterpart Japanese patent application No. 2017-213585 (A machine translation (not reviewed for accuracy) attached.).

* cited by examiner

*Primary Examiner* — Ifedayo B Iluyomade
(74) *Attorney, Agent, or Firm* — Chen Yoshimura LLP

(57) ABSTRACT

An electronic device includes: a TFT liquid crystal panel; a light source that emits light to be radiated onto a back face of the TFT liquid crystal panel; and a processor that generates a common signal to be input to a common electrode of the TFT liquid crystal panel. The processor generates the common signal so as to have a waveform that differs between when the light source is not lit and when the light source is lit.

13 Claims, 8 Drawing Sheets

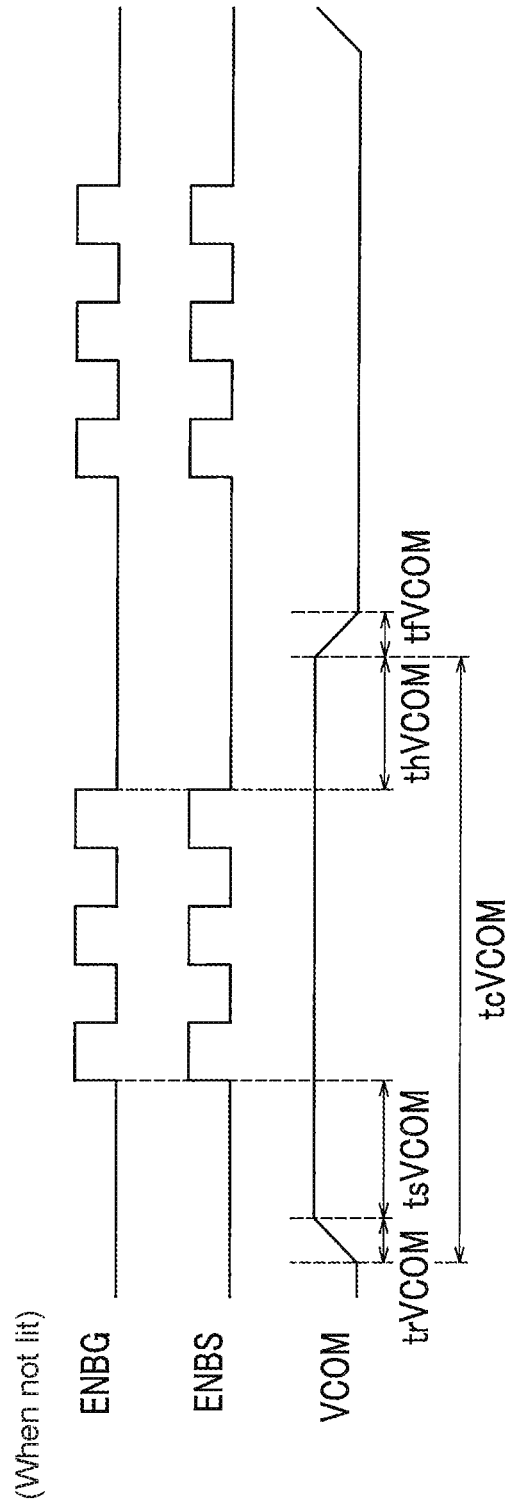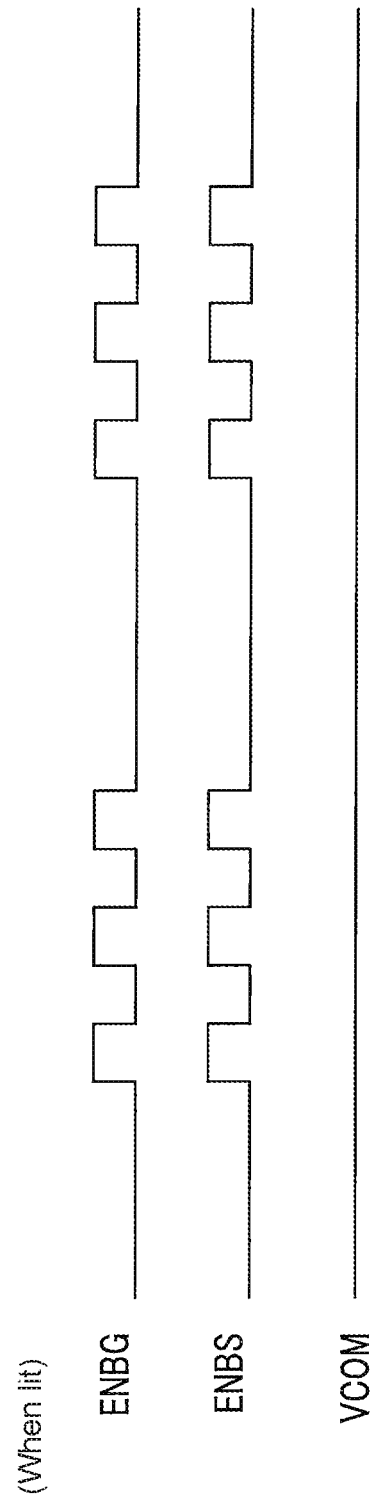

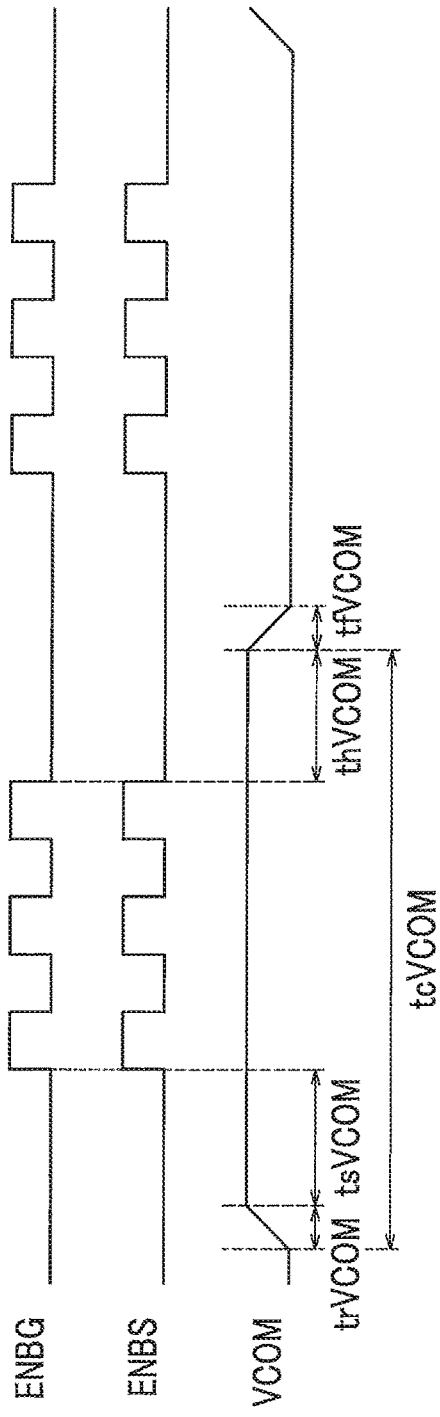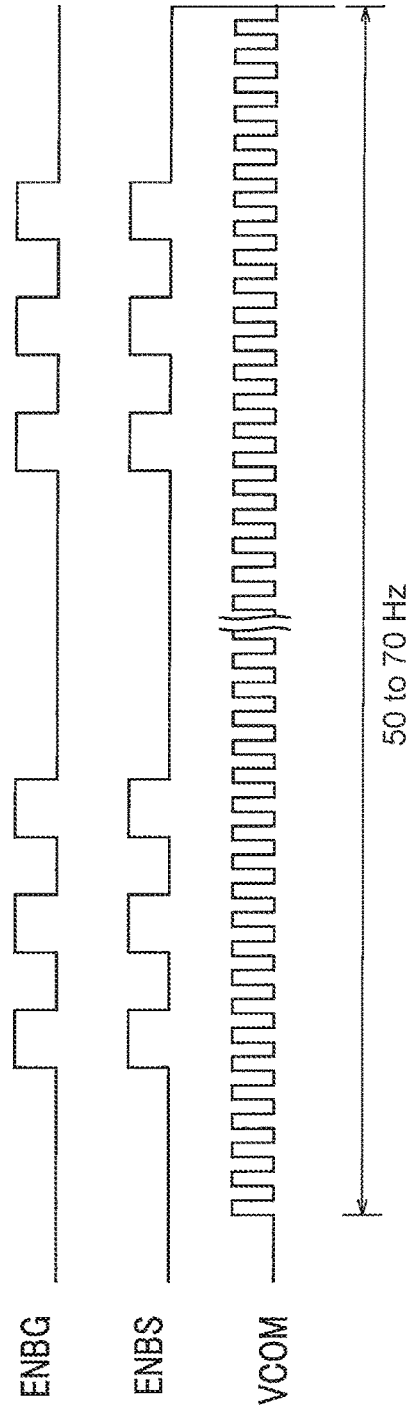
FIG. 7A
FIG. 7B

ELECTRONIC DEVICE, ELECTRONIC TIMEPIECE, DISPLAY CONTROL METHOD, AND STORAGE MEDIUM

BACKGROUND OF THE INVENTION

Technical Field

The present invention relates to an electronic device, an electronic timepiece, a display control method, and a storage medium.

Background

Transflective liquid crystal displays are, for example, employed in the display units of electronic timepieces, handheld IC recorders, and other various electronic devices. Transflective liquid crystal displays incorporate a liquid crystal panel and a light source used for backlighting (for example, see Japanese Patent Application Laid-Open Publication No. 2013-205688). In bright locations, transflective liquid crystal displays utilize natural light to allow an image formed on the liquid crystal panel to be seen, and in dark locations, transflective liquid crystal displays utilize backlight emitted from a light source when the light source is activated to allow an image formed on the liquid crystal panel to be seen.

Particularly in electronic timepieces, handheld IC recorders, and other battery-operated electronic devices, there has been a demand to reduce power consumption in display units in order to lengthen the amount of time that such devices are continuously operable. Accordingly, liquid crystal displays equipped with low-power thin-film transistor (TFT) liquid crystal panels are being employed in battery-operated electronic devices.

In liquid crystal displays equipped with low-power TFT liquid crystal panels, low power-consumption is achieved by extending the inversion period of a common signal (which may be referred to as an "LCD common power supply input signal") input to the common electrode of the TFT liquid crystal panel (in other words, by lowering the frequency of the common signal) and reducing the common signal current.

However, with this type of liquid crystal display, when the inversion period of the common signal is extended to a certain length or beyond (in other words, when the frequency of the common signal is lowered to a certain value or below), the difference between the contrast of an image formed prior to inversion of the TFT liquid crystal panel and the contrast of an image formed after inversion (hereafter referred to as "contrast difference") increases during inversion of the common signal, and contrast differences between images may be seen by users.

Accordingly, liquid crystal displays equipped with TFT liquid crystal panels that partially suppress contrast differences during inversion of the common signal have been developed recently.

However, even with these recently-developed liquid crystal displays equipped with TFT liquid crystal panels that partially suppress contrast differences during inversion of the common signal, when intense light strikes the TFT liquid crystal panel, this light emphasizes contrast differences between images. As a result, contrast differences between images may still be seen by users. Consequently, even for electronic devices in which a liquid crystal display equipped with such a TFT liquid crystal panel is employed for the display unit, contrast differences between images formed on the TFT liquid crystal panel may still be seen by users when the light source is lit.

Note that "when intense light strikes the TFT liquid crystal panel" includes, for example, cases in which a liquid crystal display is employed in the display unit of an electronic timepiece, and in order to check the time at night, a user activates the light source used for backlighting and looks at the display unit. In such cases, in the liquid crystal display, contrast differences between images formed on the TFT liquid crystal panel are emphasized, to an extent able to be seen by the user, by light (backlight) emitted from the light source. This may result in images being displayed that impart a feeling of discomfort to the user.

SUMMARY OF THE INVENTION

Accordingly, the present invention is directed to a scheme that substantially obviates one or more of the problems due to limitations and disadvantages of the related art. An electronic device, an electronic timepiece, a display control method, and a storage medium are disclosed herein.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic device, including: a TFT liquid crystal panel; a light source that emits light to be radiated onto a back face of the TFT liquid crystal panel; and a processor that generates a first common signal and causes the first common signal to be input to a common electrode of the TFT liquid crystal panel when the light source is lit, and that generates a second common signal and causes the second common signal to be input to the common electrode of the TFT liquid crystal panel when the light source is not lit, wherein a waveform of the first common signal is different from a waveform of the second common signal.

In another aspect, the present disclosure provides a display control method executed by an electronic device that includes a TFT liquid crystal panel and a light source that emits light to be radiated onto a back face of the TFT liquid crystal panel, the display control method including: generating a first common signal and inputting the first common signal to a common electrode of the TFT liquid crystal panel when the light source is lit; and generating a second common signal and inputting the second common signal to the common electrode of the TFT liquid crystal panel when the light source is not lit, wherein a waveform of the first common signal is different from a waveform of the second common signal.

In another aspect, the present disclosure provides a computer-readable non-transitory storage medium having stored thereon a program to be executable by a processor of an electronic device that includes a TFT liquid crystal panel and a light source that emits light to be radiated onto a back face of the TFT liquid crystal panel, the program causing the processor to perform the following: generating a first common signal and inputting the first common signal to a common electrode of the TFT liquid crystal panel when the light source is lit; and generating a second common signal and inputting the second common signal to the common electrode of the TFT liquid crystal panel when the light source is not lit, wherein a waveform of the first common signal is different from a waveform of the second common signal.

It is to be understood that both the foregoing general description and the following detailed description are exemplary and explanatory, and are intended to provide further explanation of the invention as claimed.

BRIEF DESCRIPTION OF THE DRAWING

FIG. 5A is a signal waveform diagram illustrating operation of the electronic device according to Embodiment 1.

FIG. 5B is a signal waveform diagram illustrating operation of the electronic device according to Embodiment 1.

FIG. 7A is a signal waveform diagram illustrating operation of an electronic device according to Embodiment 2.

FIG. 7B is a signal waveform diagram illustrating operation of the electronic device according to Embodiment 2.

DETAILED DESCRIPTION OF THE PREFERRED EMBODIMENTS

Figure 1:
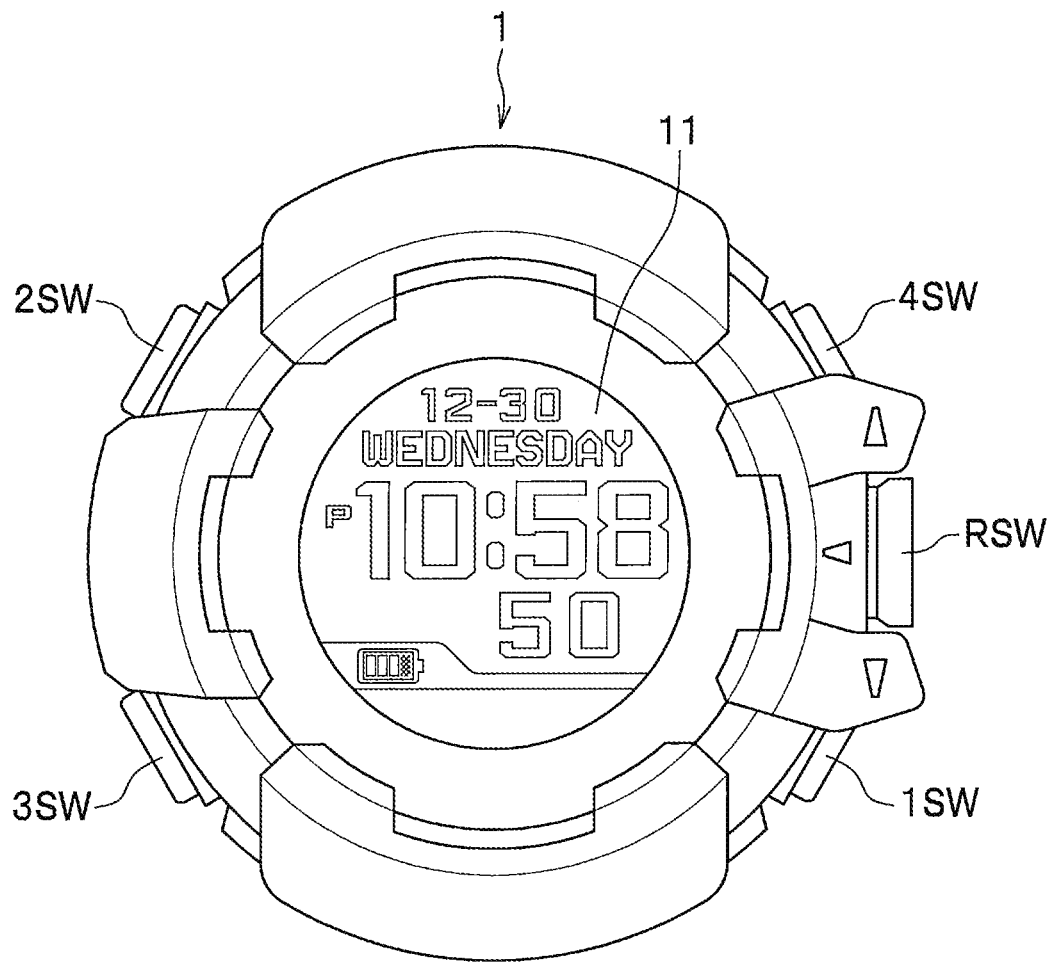
FIG. 1 is a schematic view illustrating the overall appearance of an electronic device according to Embodiment 1 of the present invention.

Exemplary embodiments (hereafter referred to as "present embodiments") will be described in detail with reference to the drawings. Note that the drawings schematically illustrate the present invention only to an extent such that the present invention is able to be sufficiently understood. Accordingly, the present invention is not limited to the illustrated examples. Further, in the drawings, common or equivalent elements are given the same reference numbers, and duplicate explanation thereof will be omitted.

Embodiment 1

<Electronic Device Configuration>

Figure 2:
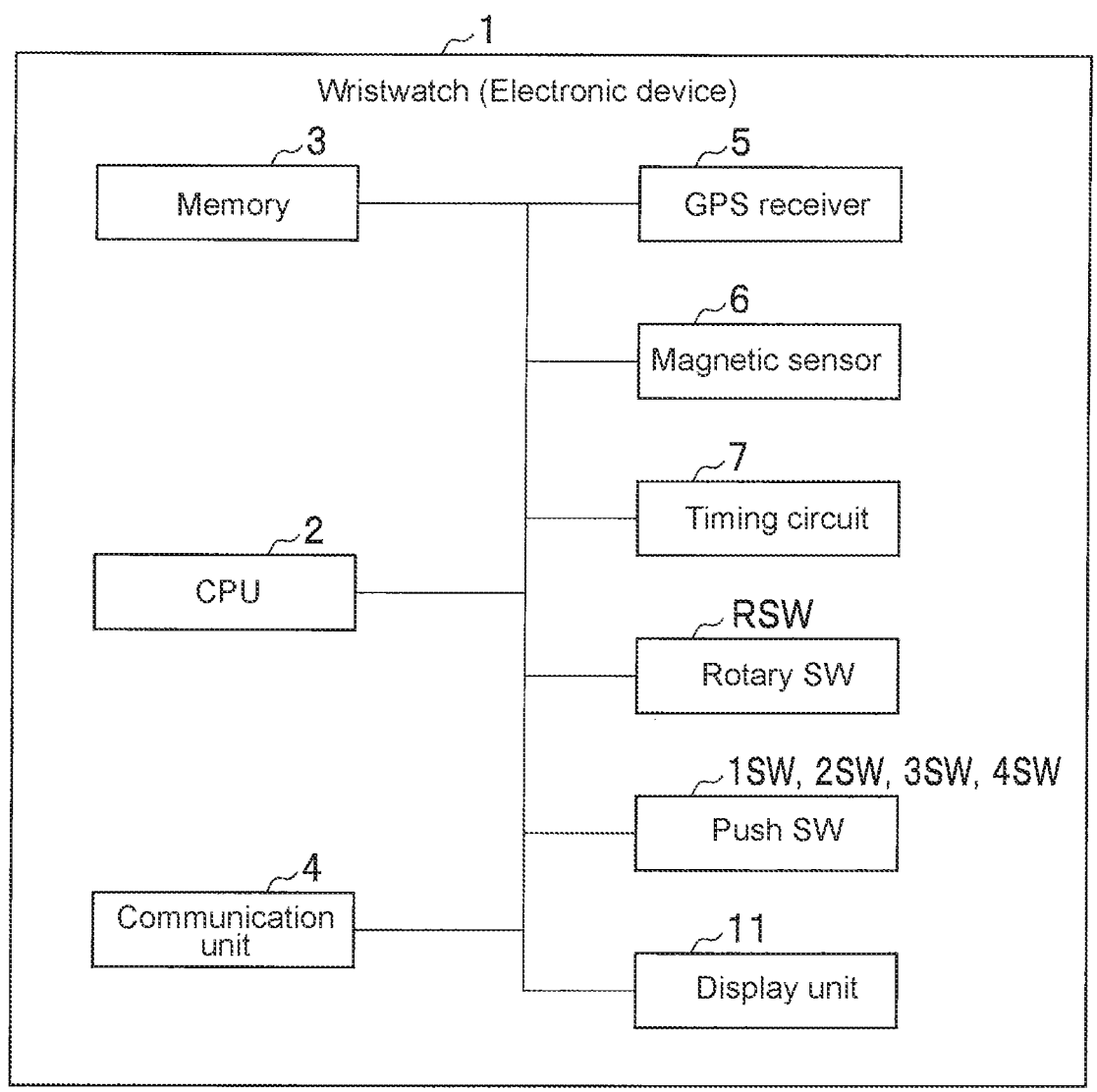
FIG. 2 is a block diagram illustrating internal configuration of the electronic device according to Embodiment 1.

The configuration of an electronic device according to the Embodiment 1 of the present invention will be described with reference to FIGS. 1 and 2. In the following, a configuration is described in which the electronic device according to Embodiment 1 is a battery-operated electronic timepiece (for example, a wristwatch). FIG. 1 is a schematic view illustrating the overall appearance of a wristwatch 1, which is an example of an electronic device according to Embodiment 1. FIG. 2 is a block diagram illustrating internal configuration of the wristwatch 1.

As illustrated in FIG. 1, with regards to external configuration, the wristwatch 1, which is an example of an electronic device according to Embodiment 1, includes a rotary switch RSW able to be press-operated or rotatably-operated, push switches 1SW, 2SW, 3SW, and 4SW able to be press-operated, and a display unit 11 for displaying various information. The display unit 11 is configured by a liquid crystal display equipped with a low-power thin-film transistor (TFT) liquid crystal panel.

As illustrated in FIG. 2, with regards to internal configuration, the wristwatch 1 includes a CPU 2 for controlling the operation of each part of the wristwatch 1, memory 3 for storing various programs and information, a communication unit 4 for communicating with other devices (for example, a smartphone, etc.), a GPS receiver 5 for acquiring current positional information from GPS satellites, a magnetic sensor 6 for detecting the magnetic field of the earth, and a timing circuit 7 for measuring time.

The central processing unit (CPU) 2 executes a control program stored in the memory 3.

The memory 3 is pre-stored with the control program executed by the CPU 2.

The communication unit 4 communicates with another device (for example, a smartphone, etc.) over a wired or wireless connection. In the present embodiment, a configuration is described in which the communication unit 4 includes Bluetooth Low Energy (BLE) (registered trademark) communication functionality, and the communication unit 4 communicates with other devices utilizing this BLE communication functionality.

<Display Unit Configuration>

Figure 3:
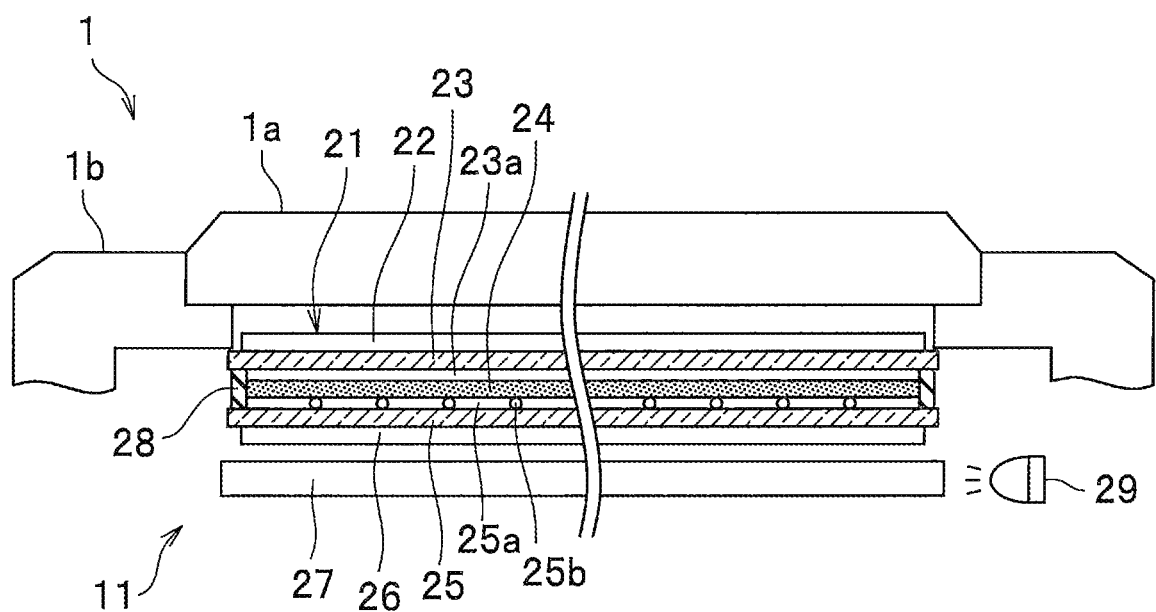
FIG. 3 is a schematic cross-sectional view illustrating a cross-sectional configuration of a display unit according to Embodiment 1.
Figure 4:
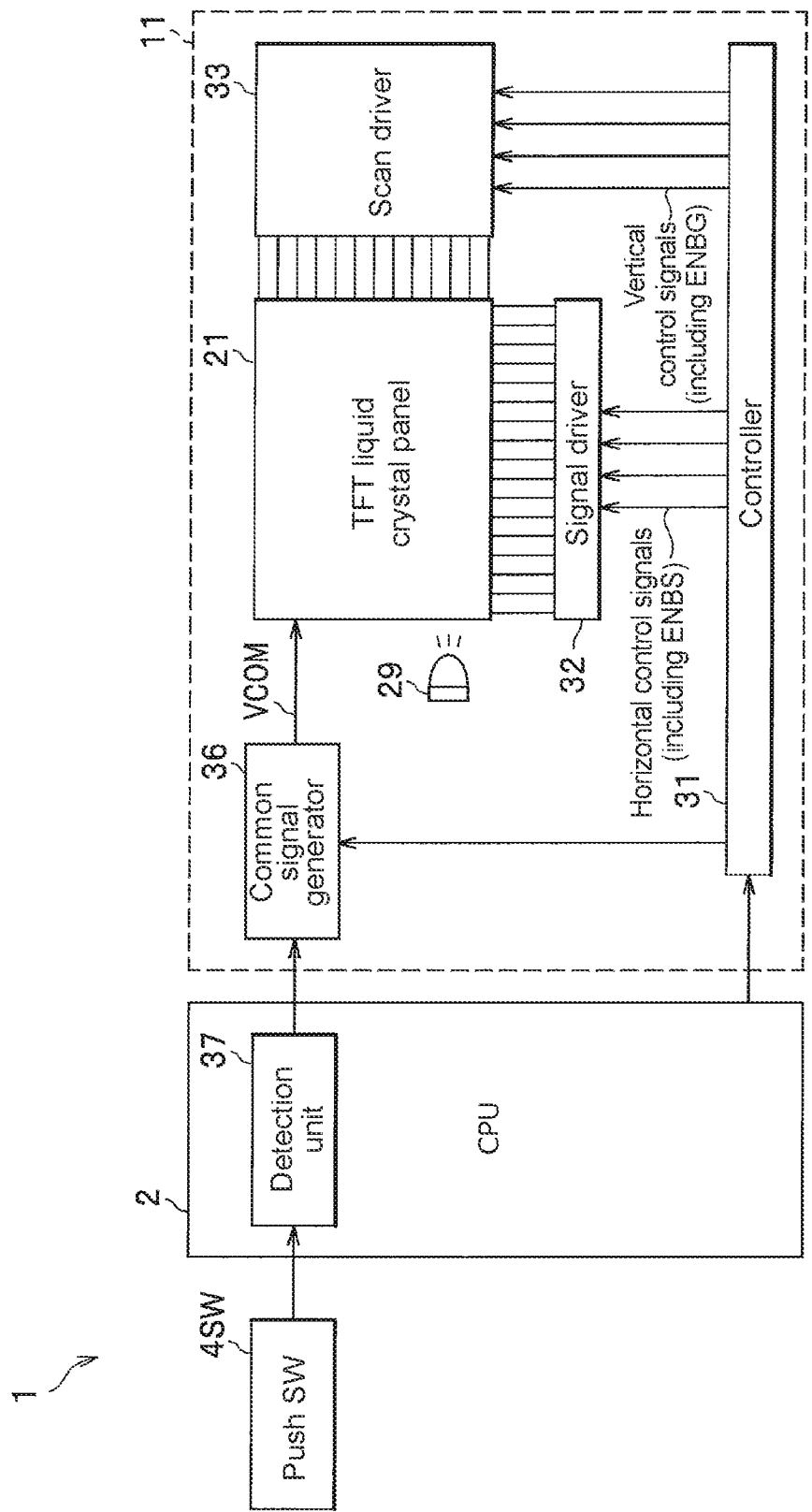
FIG. 4 is a schematic circuit diagram illustrating a circuit configuration for the display unit according to Embodiment 1.

Description of the configuration of the display unit 11 follows, with reference to FIGS. 3 and 4.

FIG. 3 is a schematic cross-sectional view illustrating a cross-sectional configuration of the display unit 11. FIG. 4 is a schematic circuit diagram illustrating a circuit configuration for the display unit 11.

As illustrated in FIG. 3, the display unit 11 is provided with a thin-film transistor (TFT) liquid crystal panel 21, a light-guiding plate 27 for guiding light (backlight) to a back face of the TFT liquid crystal panel 21, and a light source 29 for emitting light (backlight) to be shined onto the back face of the TFT liquid crystal panel 21.

An upper polarizer 22, an upper glass substrate 23, a liquid crystal layer 24, a lower glass substrate 25, and a lower polarizer 26 are stacked together in the TFT liquid crystal panel 21.

The upper polarizer 22 is a plate-shaped member for polarizing light. The upper polarizer 22 is disposed above the upper glass substrate 23.

The upper glass substrate 23 is a glass substrate that is disposed above the liquid crystal layer 24.

The liquid crystal layer 24 is a layer in which liquid crystals are enclosed.

The lower glass substrate 25 is a glass substrate that is disposed below the liquid crystal layer 24.

The lower polarizer 26 is a plate-shaped member for polarizing light. The lower polarizer 26 is disposed below the lower glass substrate 25.

The liquid crystal layer 24 is disposed between the upper glass substrate 23 and the lower glass substrate 25. The liquid crystal layer 24 is sealed-off by a sealing member 28. A transparent common electrode 23a is disposed on a lower face (the face that opposes the liquid crystal layer 24) side of the upper glass substrate 23. Transparent pixel electrodes 25a and thin-film transistors (TFTs) 25b are disposed on an upper face (the face that opposes the liquid crystal layer 24) side of the lower glass substrate 25.

In the present embodiment, the TFT liquid crystal panel 21 of the display unit 11 is housed inside a timepiece case 1b and is covered from above by timepiece glass 1a. The timepiece case 1*b* is a casing for the wristwatch 1. The timepiece glass 1*a* is a covering member for the wristwatch 1.

The light-guiding plate 27 is disposed below the TFT liquid crystal panel 21, and the light source 29 for backlighting is disposed to the side of the light-guiding plate 27. The light source 29 is lit in response to an operation to activate the light source 29 performed using a switch for instructing activation of the light source 29. In the present embodiment, a configuration is described in which the push switch 4SW is the switch for instructing activation of the light source 29, and a press operation of the push switch 4SW is the operation to activate the light source 29. When the push switch 4SW has been pressed, the light source 29 is lit for a certain length of time (for example, from 1.5 to 3 seconds), after which the light source 29 turns off automatically.

Note that in the present embodiment, a configuration is described in which the length of time that the light source 29 is lit for a single activation operation (for a single press operation of the push switch 4SW) is set so as to be a length of time from 1.5 seconds to 3 seconds. However, the length of time that the light source 29 is lit for a single activation operation is not limited thereto. For example, the length of time that the light source 29 is lit may be set so as to be any length of time from 1 second to 5 seconds.

A low-power panel is employed as the TFT liquid crystal panel 21 according to the present embodiment. Further, the wristwatch 1 achieves low power-consumption by extending the inversion period of a common signal VCOM input to the common electrode 23*a* of the TFT liquid crystal panel 21 (in other words, by lowering the frequency of the common signal VCOM) and reducing the common signal VCOM current.

For example, in a TFT liquid crystal panel that is not a low-power TFT liquid crystal panel, the frequency of the common signal VCOM has a value from 50 to 70 Hz (for example, 64 Hz). In contrast thereto, in the low-power TFT liquid crystal panel 21 according to the present embodiment, the frequency of the common signal VCOM has a value less than or equal to 1 Hz (for example, 0.5 Hz).

As illustrated in FIG. 4, the display unit 11 of the wristwatch 1 includes the TFT liquid crystal panel 21, the light source 29, a controller 31, a signal driver 32, a scan driver 33, and a common signal generator 36. In addition, the CPU 2 of the wristwatch 1 includes a detection unit 37.

The controller 31 generates horizontal control signals and outputs the horizontal control signals to the signal driver 32. The controller 31 also generates a vertical control signals and outputs the vertical control signals to the scan driver 33. The horizontal control signals are signals for controlling operation of the signal driver 32. The vertical control signals are signals for controlling operation of the scan driver 33.

The controller 31 also generates a common signal generation instruction signal and outputs the common signal generation instruction signal to the common signal generator 36. The common signal generation instruction signal is a signal for instructing the common signal generator 36 to generate the common signal VCOM. The common signal generator 36 generates the common signal VCOM in response to the common signal generation instruction signal, and outputs the common signal VCOM to the common electrode 23*a* of the TFT liquid crystal panel 21. In so doing, the common signal generator 36 generates a common signal VCOM adapted for low power-consumption so long as a suspend signal, described below, has not been input from the detection unit 37. However, if a suspend signal, described below, has been input from the detection unit 37, the common signal generator 36 will generate a common signal VCOM adapted for the reduction of contrast differences. The common signal VCOM adapted for low power-consumption is a signal with a waveform that has been subjected to voltage inversion control. The common signal VCOM adapted for the reduction of contrast differences is a signal with a waveform for which voltage inversion control has been suspended.

The signal driver 32 outputs RBG signals to the TFT liquid crystal panel 21. The RBG signals are analog voltage signals expressing RBG values for each pixel.

The scan driver 33 generates scan signals (scan pulses) and outputs the scan signals to the TFT liquid crystal panel 21. The scan signals are digital voltage signals with a high level and a low level.

The common signal generator 36 generates the common signal VCOM and outputs the common signal VCOM to the common electrode 23*a* of the TFT liquid crystal panel 21. The common signal VCOM is digital voltage signal with a high level and a low level.

When an operation to activate the light source 29 is detected, the detection unit 37 has a function to detect the activation operation. When an operation to activate the light source 29 has been detected, the detection unit 37 generates the suspend signal for instructing the suspension of voltage inversion control, and the detection unit 37 outputs the suspend signal to the common signal generator 36. In such cases, the common signal generator 36 generates a common signal VCOM adapted for the reduction of contrast differences.

The horizontal control signals output to the signal driver 32 from the controller 31 include a clock signal, the RBG signals, an enable signal ENBS, and the like. The enable signal ENBS is a signal for controlling output timings of the signal driver 32. The enable signal ENBS functions as a horizontal rewrite activation signal for activating the rewriting of horizontal components in image data.

The vertical control signals output to the scan driver 33 from the controller 31 include a clock signal, an enable signal ENBG, and the like. The enable signal ENBG is a signal for controlling output timings of the scan driver 33. The enable signal ENBG functions as a vertical rewrite activation signal for activating the rewriting of vertical components in image data.

<Wristwatch Operation>

The wristwatch 1 according to Embodiment 1 features a configuration in which the common electrode 23*a* of the TFT liquid crystal panel 21 is input with a common signal VCOM with a waveform that differs between when the light source 29 is not lit and when the light source 29 is lit.

Figure 6:
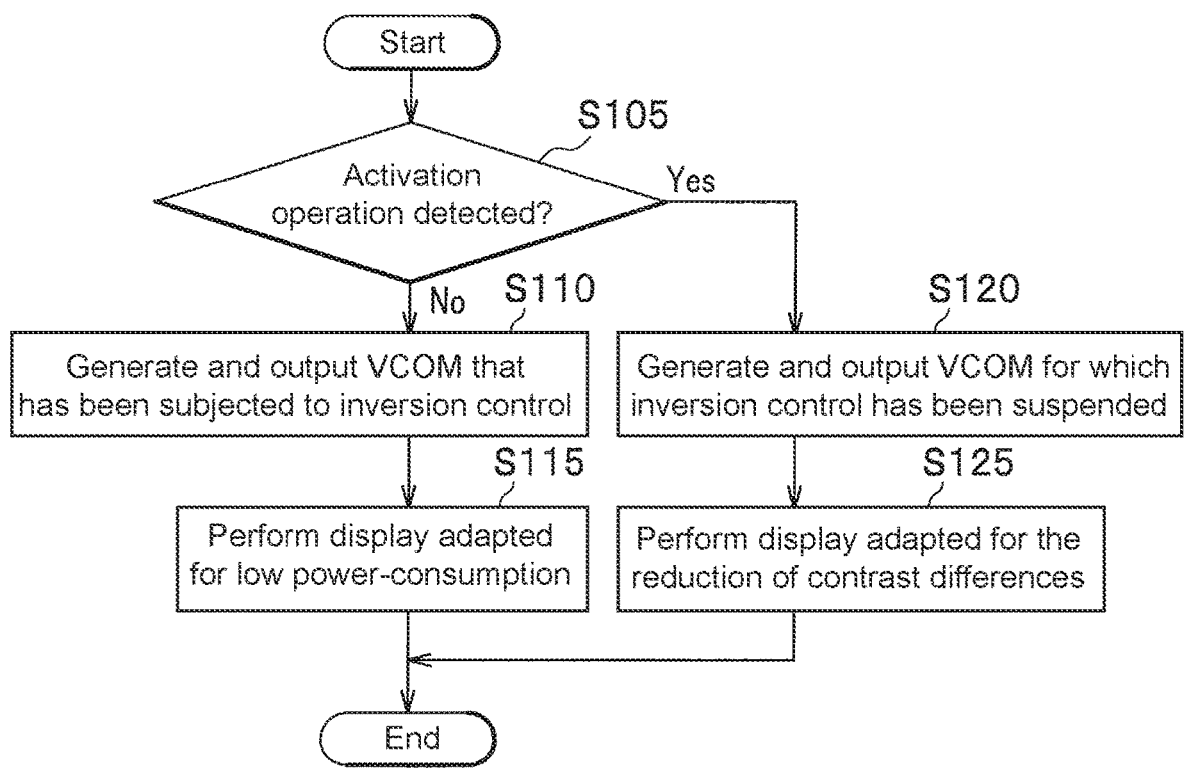
FIG. 6 is a flowchart illustrating operation of the electronic device according to Embodiment 1.

Description follows regarding operation of the wristwatch 1, with reference to FIGS. 5A, 5B, and 6. FIGS. 5A and 5B are signal waveform diagrams illustrating operation of the wristwatch 1. FIG. 6 is a flowchart illustrating operation of the wristwatch 1.

FIG. 5A illustrates signal waveforms for the enable signal ENBG, the enable signal ENBS, and the common signal VCOM when the light source 29 is not lit. FIG. 5B, on the other hand, illustrates signal waveforms for the enable signal ENBG, the enable signal ENBS, and the common signal VCOM when the light source 29 is lit.

As illustrated in FIG. 5A, when the light source 29 is not lit, the common signal VCOM is a signal that has been subjected to voltage inversion control so as to alternately switch between a high level and a low level. The length of time during which the common signal VCOM is at the high level and the length of time during which the common signal VCOM is at the low level are the same.

Note that in FIG. 5A, the time tcVCOM indicates the inversion period of the common signal VCOM.

The time trVCOM indicates the rise time of the common signal VCOM.

The time tsVCOM indicates a set time from when the common signal VCOM finishes rising until image data on the TFT liquid crystal panel 21 can be rewritten.

The time thVCOM indicates a set time from when rewriting of image data on the TFT liquid crystal panel 21 finishes until the common signal VCOM begins falling.

The time tfVCOM indicates the fall time of the common signal VCOM.

In the present embodiment, a configuration is described in which the inversion period of the common signal VCOM is 2 seconds (in other words, the frequency of the common signal VCOM is 0.5 Hz).

As illustrated in FIG. 5B, when the light source 29 is lit, the common signal VCOM is a signal for which voltage inversion control between the high level and the low level has been suspended (in other words, is a signal with a frequency of 0 Hz).

There are no rising edges or falling edges in a common signal VCOM for which voltage inversion control has been suspended (in other words, a common signal VCOM with a frequency of 0 Hz). This common signal VCOM is thus a signal that does not emphasize contrast differences between images formed on the TFT liquid crystal panel 21.

As illustrated in FIG. 6, when displaying an image on the display unit 11 or when updating an image displayed on the display unit 11, the wristwatch 1 performs the processing of step S105 to step S125. Herein, description will be given envisaging a case in which, for example, in order to check the time at night, a user of the wristwatch 1 activates the light source 29 used for backlighting to view images displayed on the display unit 11 of the wristwatch 1.

First, the detection unit 37 monitors the state of the push switch 4SW, which is the switch for instructing activation of the light source 29, and the detection unit 37 makes a determination as to whether or not an operation to activate the light source 29 has been detected (step S105).

In cases in which an operation to activate the light source 29 is not detected by the determination of step S105 (the case of "No"), the common signal generator 36 generates a common signal VCOM that has been subjected to voltage inversion control so as to alternately switch between a high level and a low level (see FIG. 5A), and the common signal generator 36 outputs the common signal VCOM to the common electrode 23a of the TFT liquid crystal panel 21 (step S110). As a result, the display unit 11 performs display adapted for low power-consumption (step S115).

However, in cases in which an operation to activate the light source 29 is detected by the determination of step S105 (the case of "Yes"), the common signal generator 36 generates a common signal VCOM for which voltage inversion control has been suspended (see FIG. 5B), and the common signal generator 36 outputs the common signal VCOM to the common electrode 23a of the TFT liquid crystal panel 21 (step S120). As a result, the display unit 11 performs display adapted for contrast difference reduction (step S125).

Note that in the present embodiment, the length of time that the common signal VCOM inversion control is suspended is set so as to be from 1.5 to 3 seconds, which is about the same as the length of time that the light source 29 is lit (strictly speaking, it is a slightly longer length of time).

According to this configuration, when the light source 29 is not lit, the common signal generator 36 of the display unit 11 generates, as the common signal VCOM, a signal that has been subjected to periodic voltage inversion control at a low frequency less than or equal to a first frequency (for example, at a frequency of 0.5 Hz, which is less than or equal to 1 Hz). However, when the light source 29 is lit, the common signal generator 36 generates, as the common signal VCOM, a signal for which periodic voltage inversion control has been suspended.

In other words, when the light source 29 is not lit, the common signal generator 36 generates a signal with a waveform adapted for low power-consumption, and when the light source 29 is lit, the common signal generator 36 generates a signal with a waveform adapted for the reduction of contrast differences between images formed on the TFT liquid crystal panel 21.

As a result, when the light source 29 is not lit the display unit 11 performs image display adapted for low power-consumption, and when the light source 29 is lit the display unit 11 performs image display adapted for the reduction of contrast differences.

With this type of wristwatch 1, contrast differences between images formed on the TFT liquid crystal panel 21 are not emphasized by light (backlight) emitted from the light source 29 when the light source 29 is lit. Accordingly, with the wristwatch 1, contrast differences between images formed on the TFT liquid crystal panel 21 are not seen by users when the light source 29 is lit. As a result, with the wristwatch 1, the display unit 11 displays images that do not impart a feeling of discomfort to users when the light source 29 is lit.

Note that the brightness of the light source 29 may drop when the light source 29 is continuously lit for a certain duration (for example, 6 seconds) or longer. However, in the present embodiment, the length of time that common signal VCOM inversion control is suspended is set so as to be a shorter length of time (for example, from 1.5 to 3 seconds) than this certain duration, and so images displayed on the display unit 11 are not affected by a drop in the brightness of the light source 29. Thus, in the present embodiment, the display unit 11 is configured such that no effect due to a drop in the brightness of the light source 29 is imparted to images, even when voltage inversion control for the common signal VCOM is suspended.

As described above, with the wristwatch (electronic timepiece) 1, this being an electronic device according to Embodiment 1, contrast differences between images formed on the TFT liquid crystal panel 21 are not seen by users when the light source 29 is lit.

Embodiment 2

In Embodiment 2 of the present invention, a wristwatch 1 is provided. This wristwatch 1 has components identical to those in Embodiment 1, but a common signal generator 36 operates differently from that in Embodiment 1.

Figure 8:
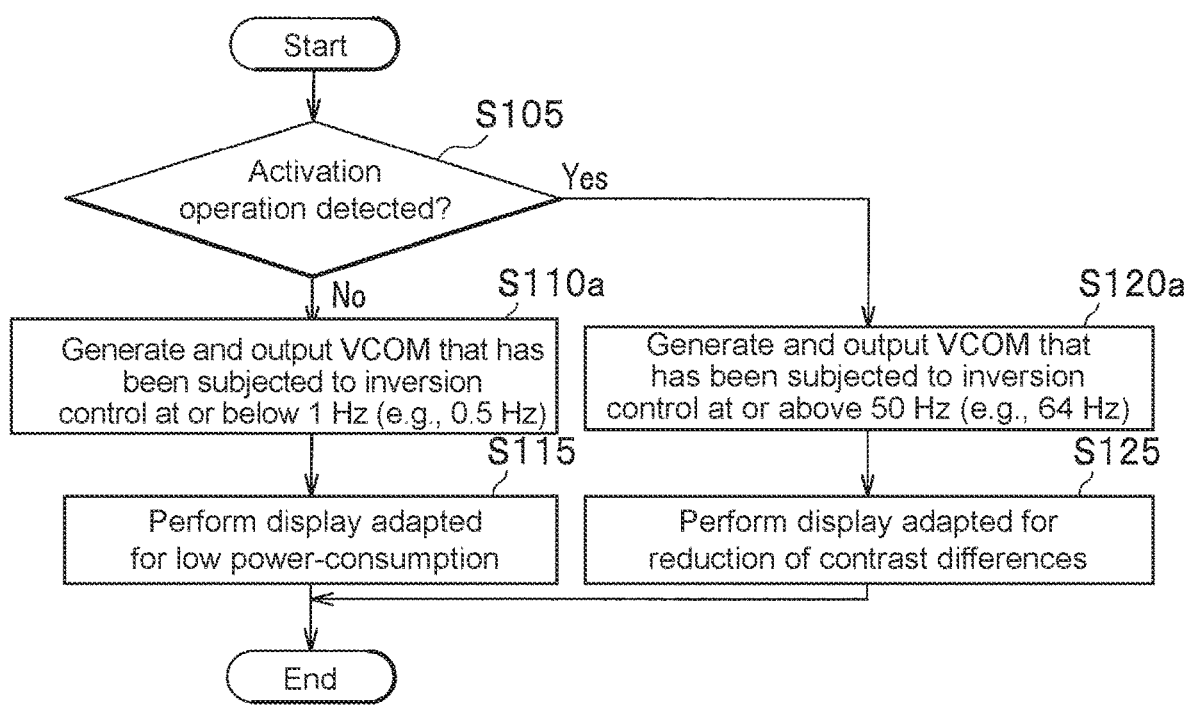
FIG. 8 is a flowchart illustrating operation of the electronic device according to Embodiment 2.

Description follows regarding operation of the wristwatch 1 of Embodiment 2, with reference to FIGS. 7A, 7B, and 8. FIGS. 7A and 7B are signal waveform diagrams illustrating operation of the wristwatch 1 of Embodiment 2. FIG. 8 is a flowchart illustrating operation of the wristwatch 1 of the present embodiment 2.

Description of the operation of the present embodiment 2 will focus on operation that differs from Embodiment 1. Accordingly, with regards to operation that is similar to that in Embodiment 1 (see FIGS. 5A, 5B, and 6), such operation in Embodiment 1 shall be read to be operation in Embodiment 2, and detailed explanation thereof will be omitted.

As illustrated in FIGS. 5A and 5B, in Embodiment 1, when the light source 29 is not lit, the common signal generator 36 generates, as the common signal VCOM, a signal that has been subjected to voltage inversion control at a frequency less than or equal to 1 Hz (for example, at a frequency of 0.5 Hz), and when the light source 29 is lit, the common signal generator 36 generates, as the common signal VCOM, a signal for which voltage inversion control has been suspended.

In contrast thereto, as illustrated in FIGS. 7A and 7B, in Embodiment 2, when the light source 29 is not lit, the common signal generator 36 generates, as the common signal VCOM, a signal that has been subjected to voltage inversion control at a frequency less than or equal to 1 Hz (for example, at a frequency of 0.5 Hz), and when the light source 29 is lit, the common signal generator 36 generates, as the common signal VCOM, a signal that has been subjected to voltage inversion control at a frequency from 50 Hz to 70 Hz (for example, at a frequency of 64 Hz).

Rising edges and falling edges in a common signal VCOM that has been subjected to voltage inversion control at a frequency from 50 Hz to 70 Hz (for example, at a frequency of 64 Hz) are not likely to overlap with image data rewrite timings. This common signal VCOM is thus a signal that is not likely to emphasize contrast differences between images formed on the TFT liquid crystal panel 21.

As illustrated in FIG. 8, Embodiment 2 is similar to Embodiment 1 (see FIG. 6), except that the processing of step S110*a* is performed in place of that for step S110, and the processing of step S120*a* is performed in place of that for step S120.

For example, in Embodiment 2, at step S110*a*, the common signal generator 36 generates a common signal VCOM that has been subjected to voltage inversion control at a low frequency less than or equal to a first frequency (for example, at a frequency of 0.5 Hz, which is less than or equal to 1 Hz) (see FIG. 7A), and the common signal generator 36 outputs the common signal VCOM to the common electrode 23*a* of the TFT liquid crystal panel 21. As a result, at step S115, the wristwatch 1 performs display adapted for low power-consumption.

Further, in Embodiment 2, at step S120*a*, the common signal generator 36 generates a common signal VCOM that has been subjected to voltage inversion control at a high frequency greater than or equal to a second frequency (for example, at a frequency of 64 Hz, which is greater than or equal to 50 Hz) that is higher than the first frequency (see FIG. 7B), and the common signal generator 36 outputs this common signal VCOM to the common electrode 23*a* of the TFT liquid crystal panel 21. As a result, at step S125, the wristwatch 1 performs display adapted for contrast difference reduction.

In Embodiment 2, similarly to in Embodiment 1, contrast differences between images formed on the TFT liquid crystal panel 21 are not emphasized by light (backlight) emitted from the light source 29 when the light source 29 is lit. Accordingly, in Embodiment 2, contrast differences between images formed on the TFT liquid crystal panel 21 are not seen by users when the light source 29 is lit.

As described above, in Embodiment 2, similarly to in Embodiment 1, contrast differences between images formed on the TFT liquid crystal panel 21 are not seen by users when the light source 29 is lit.

Note that the present invention is not limited to the above embodiments, and various modifications and variations are possible without departing from the spirit of the present invention.

For example, the above embodiments have been described in detail in order to facilitate understanding of the gist of the present invention. Accordingly, the present invention is not necessarily limited to the embodiments having all of the elements described above. For example, some of the elements may be supplemented with other elements, and some elements may be replaced with other elements. Moreover, some of the elements may be removed The present invention is not limited to wristwatches or other electronic timepieces, and is applicable to battery-operated electronic devices for which there is a demand to reduce power consumption in a display unit. In addition to electronic timepieces such as wristwatches, such electronic devices include, for example, IC recorders, clinical thermometers, pulse rate meters, step counters, video cameras, and so on.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic device, comprising:
   a TFT liquid crystal panel;
   a light source that emits light to be radiated onto a back face of the TFT liquid crystal panel; and
   a processor that generates a first common signal and causes the first common signal to be input to a common electrode of the TFT liquid crystal panel when the light source is lit, and that generates a second common signal and causes the second common signal to be input to the common electrode of the TFT liquid crystal panel when the light source is not lit,
   wherein when the light source is not lit, the waveform of the second common signal has a periodic oscillation at a frequency less than or equal to a first prescribed frequency for periodic voltage inversion control, and
   wherein a waveform of the first common signal is different from a waveform of the second common signal.

2. The electronic device according to claim 1, wherein when the light source is lit, the waveform of the first common signal does not have said periodic oscillation for the voltage inversion control.

3. The electronic device according to claim 1, wherein when the light source is lit, the waveform of the first common signal has a periodic oscillation at a frequency higher than or equal to a second prescribed frequency for voltage inversion control, the second prescribed frequency being higher than the first prescribed frequency.

4. The electronic device according to claim 1, wherein a length of time the light source is continuously lit is limited to from 1 second to 5 seconds.

5. An electronic timepiece comprising the electronic device according to claim 1.

6. A display control method executed by an electronic device that includes a TFT liquid crystal panel and a light source that emits light to be radiated onto a back face of the TFT liquid crystal panel, the display control method comprising:

generating a first common signal and inputting the first common signal to a common electrode of the TFT liquid crystal panel when the light source is lit; and generating a second common signal and inputting the second common signal to the common electrode of the TFT liquid crystal panel when the light source is not lit, wherein when the light source is not lit, the waveform of the second common signal has a periodic oscillation at a frequency less than or equal to a first prescribed frequency for periodic voltage inversion control, and wherein a waveform of the first common signal is different from a waveform of the second common signal.

7. A computer-readable non-transitory storage medium having stored thereon a program to be executable by a processor of an electronic device that includes a TFT liquid crystal panel and a light source that emits light to be radiated onto a back face of the TFT liquid crystal panel, the program causing the processor to perform the following:

generating a first common signal and inputting the first common signal to a common electrode of the TFT liquid crystal panel when the light source is lit; and generating a second common signal and inputting the second common signal to the common electrode of the TFT liquid crystal panel when the light source is not lit, wherein when the light source is not lit, the waveform of the second common signal has a periodic oscillation at a frequency less than or equal to a first prescribed frequency for periodic voltage inversion control, and wherein a waveform of the first common signal is different from a waveform of the second common signal.

8. The display control method according to claim 6, wherein when the light source is lit, the waveform of the first common signal does not have said periodic oscillation for the voltage inversion control.

9. The display control method according to claim 6, wherein when the light source is lit, the waveform of the first common signal has a periodic oscillation at a frequency higher than or equal to a second prescribed frequency for voltage inversion control, the second prescribed frequency being higher than the first prescribed frequency.

10. The display control method according to claim 6, wherein a length of time the light source is continuously lit is limited to from 1 second to 5 seconds.

11. The computer-readable non-transitory storage medium according to claim 7, wherein when the light source is lit, the waveform of the first common signal does not have said periodic oscillation for the voltage inversion control.

12. The computer-readable non-transitory storage medium according to claim 7, wherein when the light source is lit, the waveform of the first common signal has a periodic oscillation at a frequency higher than or equal to a second prescribed frequency for voltage inversion control, the second prescribed frequency being higher than the first prescribed frequency.

13. The computer-readable non-transitory storage medium according to claim 7, wherein a length of time the light source is continuously lit is limited to from 1 second to 5 seconds.

* * * * *